United States Patent

[11] 3,632,878

[72] Inventor John A. Stratman
West Hollywood, Fla.

[21] Appl. No. 823,729
[22] Filed May 12, 1969
[45] Patented Jan. 4, 1972
[73] Assignee Lumedor Products Corporation
Miami, Fla.

[54] PIGGYBACK AMPLIFIER
7 Claims, 3 Drawing Figs.

[52] U.S. Cl. 179/1 A, 179/81 B, 179/175
[51] Int. Cl. H04m 1/24, H04m 1/00
[50] Field of Search 179/103, 175.1, 175, 1 A, 81 B

[56] References Cited

UNITED STATES PATENTS

| | | | |
|---|---|---|---|
| 2,842,623 | 7/1958 | Lehr | 179/81 |
| 2,870,255 | 1/1959 | Jenkins, Jr. et al. | 179/1 |
| 3,254,160 | 5/1966 | Day et al. | 179/81 |

*Primary Examiner*—Kathleen H. Claffy
*Assistant Examiner*—Douglas W. Olms
*Attorney*—Caesar, Rivise, Bernstein & Cohen

ABSTRACT: A piggyback amplifier for use in combination with a telephone handset. The amplifier is housed in an elongated casing which is shaped in accordance with the handle of a telephone handset. The amplifier has a pair of conductive rods which extend from one end of the case which are so disposed that the rods may be inserted into the openings which are provided in a telephone handset for input leads. The amplifier case has means for securing the amplifier to the handset. The case also has openings to receive the input leads so that the input leads will be connected to the input terminals of the handset via an audio amplifier.

INVENTOR.
JOHN A. STRATMAN
BY
Caesar, Rivise,
Bernstein & Cohen
ATTORNEYS.

INVENTOR.
JOHN A. STRATMAN
BY
Caesar, Rivise, Bernstein & Cohen
ATTORNEYS.

PIGGYBACK AMPLIFIER

This invention relates generally to audio amplifiers and more particularly to an audio amplifier which is provided in a casing for attachment in piggyback fashion to a telephone handset.

Telephone handsets are used by telephone companies' service personnel in order to provide communication with the central office while installing new phones in locations remote from a central station as well as servicing faulty telephones and removing telephones. These handsets are also utilized in connection with testing equipment in order to determine which pair of lines in a cable of lines are being used at a specific location. Typically, in order to provide the serviceman with the necessary information to determine which pair of conductors are the conductors for a particular telephone, the telephone central office will provide a tone on the pair of conductive leads which are used for the particular telephone installation.

In order to test for this tone, it is necessary that the serviceman use, in conjunction with his telephone handset, a utility amplifier which includes among other things an audio amplifier for increasing the strength of signals on the input leads to the telephone handset so that the conductors in a cable can be inductively sensed.

That is, the serviceman will take his alligator test clip, which are on the ends of the test leads, and secure it to a probe such as a screwdriver. The screwdriver will then be placed adjacent a first lead, then a second lead and so on until the proper lead is sensed having the maximum amount of tone provided thereon. In this respect, it should be noted that although the tone is provided only upon one of the conductive leads, the closely adjacent leads will all inductively pick up a portion of the signal thereby making it very difficult to determine which of the leads are correct leads in the absence of a powerful amplifier which will amplify the differences in the signal.

In a more typical case, however, the serviceman will have already climbed to the top of a telephone pole and be testing for the conductive leads when he realizes the he does not have the utility amplifier with him. Also when working in teams of servicemen, normally only one amplifier will be provided for a number of servicemen. Because the inductive pickup via a prove is not adequately strong to be distinguished by a handset without an amplifier, the serviceman will typically take one test lead and connect it to a razor blade. The serviceman will then take the razor blade and cut the insulation on each of the conductors so that the direct connection via the razor blade can be made to the conductive leads. In this way, the amplifier can be eliminated. However, by causing a slit in the insulation of the wire, the conductive lead will then be exposed to the atmospheric conditions which can corrode a conductor in a very short period of time.

The openings provided in the insulation and the broken insulation caused by other means resorted to be servicemen, such as long nose pliers to grip the insulation as well as pairs of scissors, causes the the eventual corrosion completely through the conductor lead. Consequently, telephone lines must be replaced and such replacement is far more expensive than the original installation of the telephone lines to the house for telephone service in the first place.

It is therefore an object of the invention to overcome the aforementioned disadvantages.

Another object of the invention is to provide a new and improved amplifier which is secured to a telephone handset without materially altering the shape thereof.

Another object of the invention is to provide a new and improved amplifier for a telephone handset which is inexpensive to manufacture.

Yet another object of the invention is to provide a new and improved amplifier which will be secured to the handle of the telephone handset in piggyback fashion.

Yet another object of the invention is to provide a new and improved amplifier which will enable a handset to operate in both its normal mode as well as to operate with the amplifier as a test set.

These and other objects of the invention are achieved by providing for use in combination with a telephone handset, an audio amplifier. The amplifier is housed in an elongated case. The case is shaped in accordance with the handle of the handset. The amplifier has a pair of conductive rods which extend from one end thereof. The rods are so disposed that the rods may be inserted into the opening provided in the handset for input leads. The amplifier case has means for securing the amplifier to the handset. The case further includes openings to receive input leads so that the input leads will be connected to the input terminals of the handset via the audio amplifier in the case.

Other objects and many of the attendant advantages of this invention will be readily appreciated as the same becomes better understood by reference to the following detailed description when considered in connection with the accompanying drawings wherein.

Figure 1:
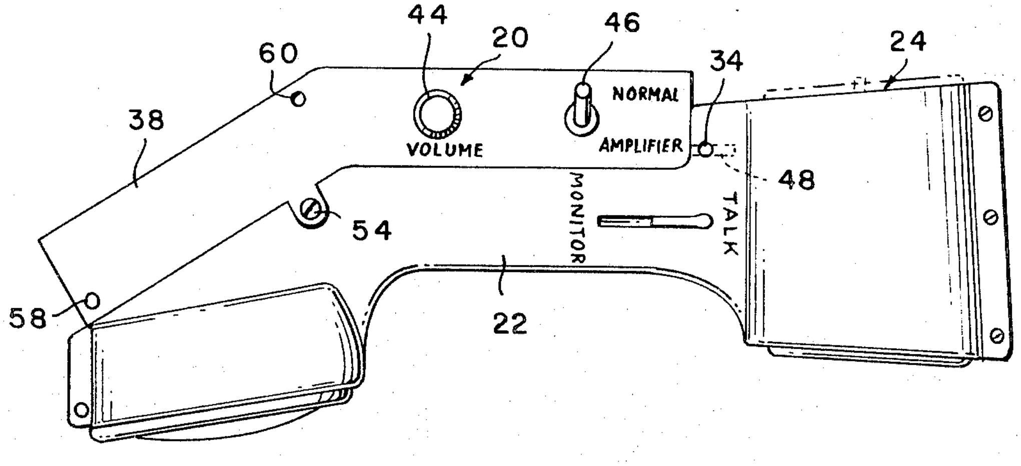
FIG. 1 is a side elevational view of a telephone handset having the piggyback amplifier embodying the invention secured thereto.

Referring now in greater detail to the various figures in the drawing wherein similar reference characters refer to similar parts, the piggyback amplifier embodying the invention is shown generally at 20 in FIG. 1. As seen in FIG. 1, piggyback amplifier 20 is secured to the rear surface of the handle 22 of a telephone handset 24.

Figure 2:
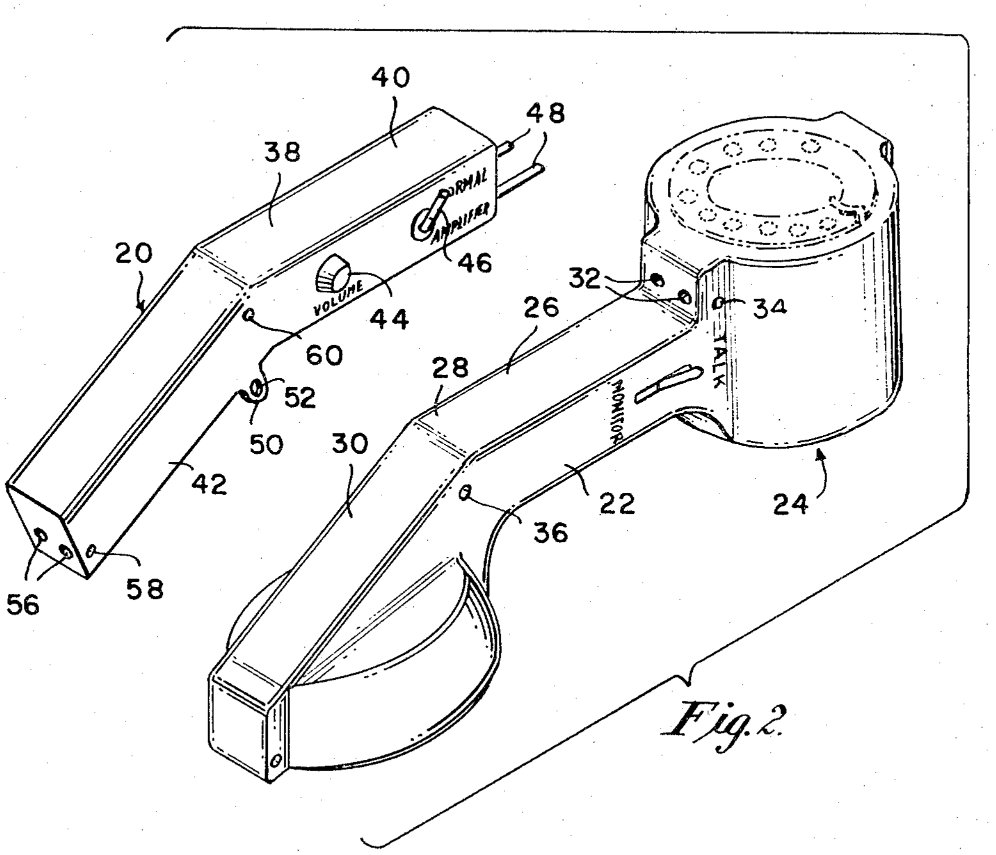
FIG. 2 is an exploded perspective view of the telephone handset and the piggyback amplifier embodying the invention.

The handset 24, as best seen in FIG. 2 is a conventional handset which is used by servicemen for telephone companies. The handle 22 of the handset 24 has a rear surface 26 which is comprised of two planar surfaces 28 and 30 which extend at an angle with respect to each other. The handset 24 also includes a pair of openings 32 which are utilized to receive the ends of input leads.

The openings 32 include therein a pair of terminals to which the input leads are secured by fasteners 34 which extend through openings that extend transversely to openings 32. Another pair of openings 36 are provided on the lateral surface of the handle 22. Openings 36 are utilized to secure a belt clip to the handset 24.

As best seen in FIG. 1, the piggyback amplifier 20 preferably comprises an elongated case 38 for housing the audio amplifier circuitry within the piggyback amplifier. The housing 38 is shaped in accordance with the rear surface of the handle 22 of the headset 24 so that the piggyback amplifier 20 may be secured thereto without unduly adding to the size of the handset.

Thus, the case 38 includes a first rectangular portion 40 which is parallel to surface 28 and a second rectangular portion 42 which is parallel to surface 30 of the rear surface 26 of the handle 22.

The case 38 is preferably comprised of a high-impact thermoplastic resin such as "Cycolac" which is capable of withstanding shock and hard handling. An adjusting knob 44 is provided on the lateral surface of the case 38 for adjusting the gain of the audio amplifier. A toggle switch 46 is also provided in the lateral surface of the case 38 to switch the operation of the amplifier on and off. That is, when the toggle switch is in the position adjacent the legend "normal" provided on case 38, the leads in the audio amplifier directly connect the input leads in openings 56 to the input terminals of the handset 24. However, when the toggle switch is in the position adjacent the legend "amplifier" provided on case 38, the input leads to the piggyback amplifier are connected to the terminals of the handset via the audio amplifier provided in the piggyback amplifier 20.

The piggyback amplifier 20 further includes a pair of metal rods 48 which project from a first end of the elongated case 38.

Rods 48 are so disposed that when the portion 40 of the case 38 is flat against the surface 28 of the rear surface 26 of the handle 22 of the handset 24, the rods 48 are aligned with and extend into the openings 32 of the telephone handset. As best seen in FIG. 1, the rods 48 are aligned with the openings 34 so that the rods 48 can be secured to the input terminals of the handset by threaded fasteners inserted in openings 34. The rods 48 are preferably comprised of a metal which is highly conductive.

The case 38 further includes a pair of tabs 50 which depend from the lateral sides of the case 38. The tabs 50 each include an opening 52 which is aligned with the openings 36 of the handset 24 when the rods 48 are secured in openings 32. A pair of fasteners are provided through the openings 54 and are threadedly engaged in the openings 36 of the handset in order to secure the piggyback amplifier to the handset 24.

AS best seen in FIG. 2, at the opposite end of the case 38, a pair of openings 56 are provided for reception of the input leads. Openings 58 are provided in each lateral surface of the case 38 and are aligned with and extend transversely to openings 56. Fasteners are inserted through openings 58 to secure the input leads in the openings 56 to the terminals of the audio amplifier within the case 38. The case 38 also includes a pair of openings 60 in the lateral surfaces which are utilized to replace openings 36 for the reception of a belt clip which is used by the serviceman to secure the handset 24 when not in use to his utility belt.

It can therefore be seen that the piggyback amplifier 20 can be secured to a conventional handset very quickly and very easily. It is necessary only to remove the test or input leads from the openings 32 of the handset and remove the belt clip from openings 36. The two rods 48 are then placed into the openings 32 of the handset. Fasteners 54 are then placed through openings 52 in tabs 50 to secure the piggyback amplifier to the rear surface of the handle of the handset and the input leads are then inserted into the openings 56 which are provided in the piggyback amplifier.

The handset is now ready to be used again and can be used either as a regular handset or as a test set which has the built-in amplifier in the case 38. In the regular operation, the switch on the amplifier is turned to the "normal" position. That is, the toggle switch 46 has the arm adjacent the "normal" legend on the side of the case. The serviceman then has the option of either talking or monitoring depending on the location of the talk-monitor switch which is provided on the handset.

To use the handset as a test set, it is necessary only to switch on the toggle switch 46 to the "amplifier" position. The talk-monitor switch of the handset is then placed in the position that is normally used by the serviceman when the handset is used as a test set and then the volume switch 44 is adjusted to give the proper gain in the amplifier that is required.

Because of the fact that the amplifier case is elongated and streamlined, it adds very little to the bulk of the handset 24. Consequently, it is efficiently carried with the handset at all times. Thus, wherever the handset is carried, the amplifier will be carried and be available for use in order to test for the conductors in a cable which are to be used.

Figure 3:
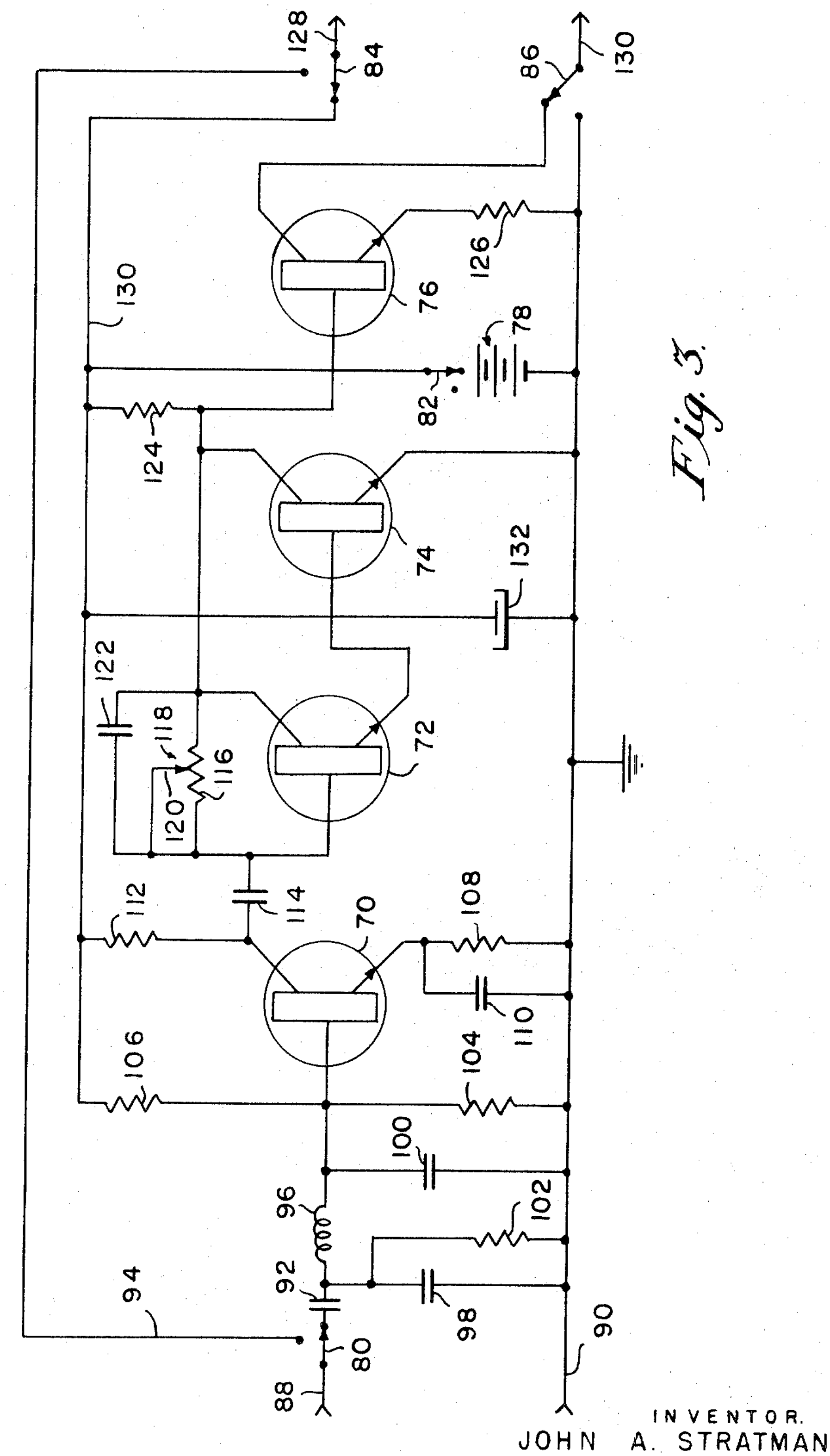
FIG. 3 is a schematic diagram of the electrical circuitry utilized in the piggyback amplifier.

The circuitry utilized in the piggyback amplifier is shown schematically in FIG. 3. The circuit includes four transistors 70, 72, 74 and 76 which are preferably of the NPN type.

The circuit also includes a DC battery 78 and four switches 80, 82, 84 and 86 which are controlled by the toggle switch 46 which is a four pole double throw switch. Switches 82 through 86, as shown in FIG. 3, are in the position with the poles thrown into the position that enables the circuit to act as an amplifier for the handset. That is, the poles of the switches 80 through 86 are connected to the terminals as shown in FIG. 3 when the toggle switch is in the amplifier position and the amplifier is connected between the input leads and the earphone of the handset 24. When the toggle switch is thrown to the normal position shown in FIG. 1, each of the poles is thrown to the opposite terminal of the switch shown.

The circuit includes a pair of terminals 88 and 90 which are connected to the handset input leads when the leads are inserted in openings 56 of the piggyback amplifier. The terminal 88 is connected to the switch 80. Terminal 90 is connected to ground. The switch 80, when the amplifier is switched into the handset circuitry, connects the input terminal 88 to a coupling capacitor 92. When the handset is in normal operation and the toggle switch is adjacent the "normal" legend on the case of the piggyback amplifier, switch 80 connects the input terminal 88 to a bypass lead 94. The coupling capacitor 92 is connected to the base of transistor 70 via a filter circuit which is comprised of inductor 96 and capacitors 98 and 100, and resistors 102 and 104. The capacitor 98 is connected between capacitor 92 and ground. Inductor 96 is connected between capacitor 92 and the base of transistor 70. Resistor 102 is connected in parallel across capacitor 98 and the capacitor 100 is connected between the base of transistor 70 and ground across resistor 104.

The transistor 70 is in a common emitter class A amplifier circuit which has high gain and low noise characteristics. The input filter to the base of transistor 70 is a low pass filter. The base of transistor 70 is connected via resistor 106 to switch 82. Switch 82 is connected to battery 78 when the amplifier is turned on. Thus, resistor 106 acts in conjunction with the filter to provide a stabilizing voltage at the base of transistor 70.

The emitter of transistor 70 is connected via resistor 108 and capacitor 110 to ground. The resistor 108 acts to provide bias at the emitter of the transistor 70 and the capacitor 110 acts to stabilize the voltage at the emitter. The collector of transistor 70 is connected via resistor 112 to switch 82. Resistor 112 acts as the collector load resistance. The collector of transistor 70 is also connected via a coupling capacitor 114 to the base of transistor 72.

Transistor 72 and transistor 74 are connected together in a high gain Darlington amplifier configuration. That is, the emitter of transistor 72 is connected to the base of transistor 74. The collector of transistor 72 and the collector of transistor 74 are connected together. The emitter of transistor 74 is connected to ground. The collector of transistor 72 is connected to the base of transistor 72 via the resistor 116 of a potentiometer 118.

The potentiometer 118 also includes a wiper arm 120 which enables the variance of the resistance between the collector and the base of the transistor 72. A capacitor 122 is provided across the resistor 116 of the potentiometer. Capacitor 122 acts as a bypass capacitor to provide AC stabilization for the Darlington amplifier.

The collector of transistor 74 is connected via a resistor 124 to switch 82. Resistor 124 is the load resistance of the collector of transistor 74. In addition, the collector of transistor 74 is also connected to the base of transistor 76.

Transistor 76 is connected as a class A power amplifier. The emitter of transistor 76 is connected via a resistor 126 to ground. The resistor 126 acts to provide emitter bias to transistor 76. The collector of transistor 76 is connected to the switch 86. Switch 84 is connected to output terminal 128 and switch 86 is connected to output terminal 130. The output terminals 128 and 130 are connected to the roads 48 for insertion into the input terminals of the handset circuitry.

When the amplifier circuitry is turned on, the arms of the switches 84 and 86 are connected respectively to the line 130 which is connected to the positive terminal of the battery 78 and the emitter of transistor 76. When the amplifier is not in operation, the switch 84 is connected to line 94 which bypasses the amplifier circuitry and the switch 86 is connected to the ground of the circuit. An electrolitic capacitor 132 is connected between line 130 and ground so that when the amplifier is connected to the input leads of the handset, the terminal 128 is at an AC ground.

The gain of the amplifier circuitry shown in FIG. 3 is controlled by knob 44 of the piggyback amplifier shown in FIG. 1. The knob is directly connected to wiper arm 120, which moves in accordance wit the rotation of knob 44. As the wiper arm 120 is moved to the left of resistor 116, as shown in FIG. 3, the gain of the circuitry is greatly increased as the resistance between the collector and the base is increased.

However, when the wiper arm 120 is moved to the right of the resistor 116, as shown in FIG. 3, the entire resistance is completely bypassed thereby connecting the emitter of transistor 70 directly to the base of transistor 76 via the coupling capacitor 114. The Darlington amplifier is thereby completely bypassed when the wiper arm 120 is to the far right of the resistor 116. The gain of the circuit is thereby reduced to the gain of transistor 70 and the power amplification of transistor 76.

To turn the amplifier off, the toggle switch is placed in the normal position which enables normal operation of the handset. When the toggle switch 46 is in the normal position, the input leads are connected via terminal 88 and 90 directly to the output terminals 128 and 130 of the amplifier. That is, the switch 80 connects terminal 88 directly to line 94. The switch 82 cuts off the connection of the battery 78 to the amplifier circuit. The switch 84 connects output terminal 128 to the bypass line 94 and switch 86 connects the terminal 130 to ground.

It can therefore be seen that a new and improved amplifier for a telephone handset has been provided. The amplification of the piggyback amplifier enables the handset to be utilized as a test set. Because of the streamline nature of the case of the piggyback amplifier 20, the piggyback amplifier is carried without any inconvenience to the user of the handset. It is therefore readily available for use when the serviceman needs to use the handset as a test set.

Moreover, because the amplifier enables the pickup of tone signals on a line by induction rather than a direct connection, the serviceman is not tempted to puncture the insulation about the conductors in a cable in order to determine the correct set of conductors. The piggyback amplifier will therefore prevent corrosion of the conductor leads because of the fact that the insulators will remain intact and thereby prevent the atmospheric conditions from corroding the leads.

Without further elaboration, the foregoing will so fully illustrate my invention that others may, by applying current or future knowledge, readily adapt the same for use under various conditions of service.

What is claimed as the invention is:

1. For use in combination with a telephone handset, an audio amplifier, said amplifier being housed in an elongated case, said case being shaped in accordance with the handle of said handset, said amplifier having a pair of conductive rods extending from one end thereof, said rods being so disposed that said rods may be inserted into the openings provided in said handset for input leads, said amplifier case having means for securing said amplifier to said handset, said case having openings to receive said input leads so that said input leads will be connectable to the input terminals of said handset via an audio amplifier.

2. The invention of claim 1 wherein said case includes a pair of tabs having openings therein to enable securement of said amplifier to the handset via fastening means secured in the openings provided for a belt clip.

3. The invention of claim 1 wherein the rear surface of the handle of the handset is comprised of first and second planar surface which are inclined at an angle with respect to each other and said casing includes a lowermost surface which is complementary thereto.

4. The invention of claim 1 wherein said amplifier includes a toggle switch, said switch enabling said handset to be used in normal operation by connecting said leads to the input terminals of the handset, said toggle switch being utilized to connect said amplifier into said handset circuitry when said handset is used as a test set.

5. The invention of claim 1 wherein a knob is provided on the case of said amplifier for changing the gain of the amplifier circuit.

6. An amplifying circuit for converting a handset into a test set, said circuit including a low pass input filter which is connected to a class A audio amplifier, said audio amplifier being connected to a high gain Darlington amplifier, said Darlington amplifier being connected to the class A audio amplifier, said class A audio amplifier being connected to the input of said handset, the gain of said amplifier being controlled by a potentiometer in the Darlington amplifier circuit, said amplifying circuit being housed in an elongated case, said case having a shape conforming to the handle of said handset so that said amplifier may be secured to the outer surface of said handset, said case including a pair of conductive rods at one end thereof which are so disposed that they may be inserted into the openings provided in said handset for input leads, said case further including openings at the other end thereof for reception of said input leads.

7. The invention of claim 6 wherein said case further includes tabs having openings therein which are so disposed on said case that when said rods are inserted into said openings for said input leads in said handset, said openings in said tabs are aligned with the openings in said handset for a belt clip so that fastening means may be secured in said aligned openings for securement of said case to said handset.

* * * * *

UNITED STATES PATENT OFFICE

CERTIFICATE OF CORRECTION

Patent No. 3,632,878 Dated January 4, 1972

John H. Stratman

It is certified that errors appear in the above-identified patent and that said Letters Patent are hereby corrected as shown below:

(1) In the Preamble "Lumedor" should be --Lumidor--.

(2) In Column 1 on Line 56 "the the" should be --the--.

(3) In Column 4 on Line 60 "roads" should be --rods--.

Signed and sealed this 13th day of June 1972.

(SEAL)
Attest:

EDWARD M.FLETCHER,JR.
Attesting Officer

ROBERT GOTTSCHALK
Commissioner of Patents